United States Patent [19]

Wierer et al.

[11] Patent Number: 5,508,100
[45] Date of Patent: Apr. 16, 1996

[54] AQUEOUS BINDER COMPOSITION

[75] Inventors: Konrad A. Wierer, Mehring; Gerhard Brink, Burghausen, both of Germany

[73] Assignee: Wacker-Chemie GmbH, Munich, Germany

[21] Appl. No.: 523,899

[22] Filed: Sep. 6, 1995

Related U.S. Application Data

[63] Continuation-in-part of Ser. No. 244,967, filed as PCT/EP92/02933, Jul. 12, 1994, abandoned.

[30] Foreign Application Priority Data

Dec. 20, 1991 [DE] Germany .......................... 41 42 460.3

[51] Int. Cl.$^6$ .............................. A32B 7/12; A32B 23/66; C09J 123/08; C09J 133/26
[52] U.S. Cl. ........................ 428/283; 156/327; 156/332; 156/331.8; 428/284; 428/286; 428/340; 524/555; 524/563; 524/564
[58] Field of Search ..................... 156/327, 332, 156/331.8; 428/283–284, 286, 323, 392; 524/423, 425, 427, 555, 563, 564

[56] References Cited

U.S. PATENT DOCUMENTS

| | | | |
|---|---|---|---|
| 3,228,790 | 1/1966 | Sexsmith et al. | 428/283 |
| 3,380,851 | 4/1968 | Lindemann et al. | 428/283 |
| 3,459,698 | 7/1969 | Mantell et al. | 428/284 |
| 3,498,875 | 3/1970 | Lindemann et al. | 428/283 |
| 3,526,538 | 9/1970 | Lindemann et al. | 428/283 |
| 3,578,618 | 5/1971 | Beardsley | 524/563 |
| 3,669,822 | 6/1972 | Cowen | 428/340 |
| 3,672,949 | 6/1972 | Brown | 428/340 |
| 3,672,950 | 6/1972 | Murphy et al. | 428/340 |
| 3,673,060 | 6/1972 | Murphy et al. | 428/340 |
| 3,714,107 | 1/1973 | Smith | 524/423 |
| 4,205,041 | 5/1980 | Hymes | 524/427 |
| 4,345,044 | 8/1982 | Columbus et al. | 524/423 |
| 4,610,915 | 9/1986 | Crenshaw et al. | 428/284 |
| 4,636,418 | 1/1987 | Kennard et al. | 428/284 |
| 4,735,986 | 4/1988 | Iacoviello | 524/427 |
| 4,743,475 | 5/1988 | Negri et al. | 524/427 |
| 5,025,046 | 6/1991 | Soerens | 524/72 |
| 5,120,785 | 6/1992 | Walker et al. | 524/423 |
| 5,340,392 | 8/1994 | Westbrook et al. | 524/423 |

FOREIGN PATENT DOCUMENTS 9215742  9/1992  European Pat. Off. .
2243687  3/1973  Germany .

OTHER PUBLICATIONS

Rompp Chemie Lexikon, 9 Auflage 1991, J. 3210–3211.
Seiten–Ole–Fette–Wachse, Jg 91, Nr.16, S.545–549 (1965).
W. Schumann, Die Praxis des Papiermaches, Verlag P. Keppler Hensenstramm, S. 241–245 (1975).

*Primary Examiner*—Peter A. Szekely
*Attorney, Agent, or Firm*—Burgess, Ryan and Wayne

[57] ABSTRACT

A product is obtained by a process involving binding two or more layers of tissue fabrics derived from cellular pulp or cellulose fiber. In this process, a binder composition comprised of: (a) 10 to 80 parts by weight of an aqueous plastics dispersion of a solids content of 30 to 70% by weight and based on one or more copolymers comprising vinyl acetate/ethylene copolymers, vinyl acetate/ethylene/N-methylol-(meth)acrylamide terpolymers, alkyl acrylate/N-methylol-(meth)acrylamide copolymers and vinyl acetate/ethylene/alkyl acrylate copolymers, or vinyl acetate/alkyl acrylate copolymers, which optionally have a N-methylol (meth-)acrylamide content, (b) 50 to 300 parts by weight of a filler which has an average particle size of 0.5 to 100 μm, and (c) 0 to 4 parts by weight of a thickener and/or at least 0.1 parts by weight of a dispersing agent to a portion of a single layer of tissue, affixing a further single layer of tissue and drying to obtain a prelaminate. (2) An additional binder composition is applied to this prelaminate thereby affixing a further single layer of tissue, and drying. Optionally, step (2) can be repeated one or more times.

9 Claims, No Drawings

AQUEOUS BINDER COMPOSITION

This application is a continuation-in-part, of application Ser. No. 08/244,967, filed Jun. 17, 1994 now abandoned.

The invention relates to the use of an aqueousbinder composition in the lamination of two or more layers of tissue fabrics.

The lamination of tissue fabrics, for example based on cellulose fibers is used to produce paper tablecloths or paper serviettes. The binders used for this purpose are usually plastisols, for example mixtures of vinyl chloride polymers with plasticizers. To this end, the individual tissue layers are coated with the plastisol and laminated on a high-speed laminating installation. Disadvantages of the use of plastisols are the plasticizer and solvent emissions which necessarily occur during production. A further disadvantage, especially when PVC-based plastisols are used, is the high chlorine content in the product.

A further possibility for laminating tissue fabrics comprises the use of powders of thermoplastic polymers as binders. A disadvantage of this process is the low strength of the laminate. In the wet state, the individual layers easily separate from one another.

The object on which the invention was based was to provide a binder composition for the production of tissue laminates, with which laminates of high mechanical strength, soft handle and high weight per unit area are accessible, without the disadvantages of the plastisol binders (solvent and plasticizer emission) or pulverulent binders used hitherto.

Surprisingly, it was possible to achieve the objects by means of an aqueous binder composition, despite the known difficulties when processing tissues of low wet strength.

The invention relates to the use of an aqueous binder composition in the lamination of two or more layers of tissue fabrics having a weight per unit area of 18 to 25 g/m$^2$, wherein an aqueous binder composition having a viscosity of 600 to 35000 mPa.s is used which comprises a) 10 to 80 parts by weight of an aqueous plastics dispersion which has a solids content of 30 to 70% by weight and is based on polymers of one or more monomers from the group comprising acrylic acid esters, methacrylic acid esters, vinyl esters, olefins, vinyl halides, vinyl-aromatic compounds and ethylenically unsaturated carboxylic acids and their amides, which optionally comprise 0 to 10% by weight, with respect to the total weight of the polymer, of N-alkylamides and/or N-alkoxyalkylamides of ethylenically unsaturated carboxylic acids, b) 0.1 to 300 parts by weight of an organic or inorganic filler which is sparingly soluble in water and has an average particle size of 0.5 to 100 µm, and c) 0 to 4 parts by weight of a thickener and/or 0 to 6 parts by weight of a dispersing agent.

Preferred acrylic acid esters are the esters of alcohols having 1 to 10 carbon atoms, such as methyl acrylate, ethyl acrylate, propyl acrylate, butyl acrylate, 2-ethylhexyl acrylate or lauryl acrylate.

Preferred methacrylic acid esters are the esters of alcohols having 1 to 10 carbon atoms, such as methyl methacrylate, ethyl methacrylate, propyl methacrylate, butyl methacrylate, 2-ethylhexyl methacrylate or lauryl methacrylate.

Vinyl esters which may preferably be mentioned are the esters of alkylcarboxylic acids having 1 to 15 C atoms, such as vinyl acetate, vinyl propionate, vinyl butyrate, vinyl 2-ethylhexanoate, vinyl laurate, Versatic acid$^R$ vinyl ester (for example VeoVa9$^R$ or VeoVa10$^R$, vinyl esters of α-branched monocarboxylic acids having 9 and 10 C atoms respectively, commercial products from Shell) or 1-methylvinyl acetate (isopropenyl acetate).

Suitable olefins are ethylene, propylene or butadiene. The vinyl halides used are preferably vinyl chloride or vinylidene chloride. Preferred vinyl-aromatic compounds are styrene or vinyltoluene.

Examples of ethylenically unsaturated carboxylic acids and their amides are acrylic acid, methacrylic acid, itaconic acid, fumaric acid and maleic acid and the monoamides and diamides thereof, in particular acrylic acid, methacrylic acid, acrylamide and methacrylamide.

Preferred N-alkylamides and/or N-alkoxyalkylamides of ethylenically unsaturated carboxylic acids are N-methylolacrylamide, N-methylolmethacrylamide or N-(isobutoxymethyl)acrylamide or N-(isobutoxymethyl)methacrylamide.

Particularly suitable binders are aqueous dispersions of vinyl acetate/ethylene copolymers, vinyl acetate/ethylene/N-methylol(meth)acrylamide terpolymers, alkyl acrylate/N-methylol(meth)acrylamide copolymers and vinyl acetate/ethylene/alkyl acrylate copolymers or vinyl acetate/alkyl acrylate copolymers, which optionally have a N-methylol(meth)acrylamide content.

Vinyl acetate/ethylene copolymers which have a vinyl acetate content of 60 to 90% by weight and an ethylene content of 10 to 40% by weight, with respect to the total weight of the copolymer, and vinyl acetate/ethylene/N-methylolacrylamide terpolymers which have a vinyl acetate content of 60 to 90% by weight, an ethylene content of 10 to 40% by weight and a N-methylolacrylamide content of 1 to 10% by weight, with respect to the total weight of the terpolymer, the percentage by weight data adding up to 100%, are most preferred.

Preferably, the aqueous plastics dispersions have a solids content of 45 to 55% by weight. The proportion of plastics dispersion in the binder composition is preferably 40 to 60 parts by weight.

The preparation of the aqueous copolymer dispersions is preferably effected by the emulsion polymerization process and is carried out in the conventional polymerization vessels. The polymerization can be carried out batchwise or continuously, with or without the use of seed latices, with all or individual constituents of the reaction mixture being initially introduced or with the or some of the constituents being initially introduced and the other constituents or individual constituents of the reaction mixture subsequently being metered in, or by the metering process without any constituents being initially introduced. All metering is preferably carried out at the rate at which the particular component is consumed.

The emulsion polymerization is carried out in a temperature range of from 0° to 100° C. and initiated by the methods customarily used for emulsion polymerization. Initiation is effected by means of the conventional water-soluble free radical-forming agents, which are preferably used in amounts of from 0.01 to 3.0% by weight, with respect to the total weight of the monomers. Examples of such agents are ammonium persulfate and peroxodisulfate and potassium persulfate and peroxodisulfate; hydrogen peroxide; alkyl hydroperoxides, such as tert-butyl hydroperoxide; potassium peroxodiphosphate, sodium peroxodiphosphate and ammonium peroxodiphosphate; azo compounds, such as azobisisobutyronitrile or azobiscyanovaleric acid. The said free radical initiators can optionally also be combined in a known manner with from 0.01 to 0.5% by weight, with respect to the total weight of the monomers, of reducing agents. Suitable reducing agents are, for example, alkali metal formaldehyde sulfoxylates. In the case of redox initiation, one or both redox catalyst components are preferably metered in during the polymerization.

Dispersing agents which can be used are all emulsifiers and protective colloids customarily used in emulsion polymerization. Preferably, at least 0.1 parts by weight, with respect to the total weight of the monomers, of emulsifier are employed. Suitable emulsifiers are, for example, anionic surfactants, such as alkyl sulfates having a chain length of 8 to 18 C atoms, alkyl ether sulfates and alkyl aryl ether sulfates having 8 to 18 C atoms in the hydrophobic radical and up to 40 ethylene oxide or propylene oxide units, alkylsulfonates or alkyl arylsulfonates having 8 to 18 C atoms, and esters and monoesters of sulfosuccinic acid with monohydric alcohols or alkylphenols. Suitable nonionic surfactants are, for example, alkyl polyglycol ethers or alkylaryl polyglycol ethers having 8 to 40 ethylene oxide units. If appropriate, protective colloids can be used. Examples of these are polyvinyl alcohols, cellulose derivatives and dextrins.

In order to make full use of the binding power of the resin and in order to obtain a higher application weight on lamination, the binder composition comprises from 50 to 300 parts by weight of organic or inorganic fillers. The fillers should be acceptable for contact with foodstuffs or human skin, be readily dispersible and have a high whiteness, preferably>93 (in accordance with DIN 53163). In the case of gray shades, the addition of titanium dioxide is advantageous.

Suitable organic fillers are wood flour, cotton linters, cellulose and polyethylene powder, polypropylene powder, polyamide powder or polyester powder. Suitable inorganic fillers are naturally occurring or synthetic silicates, such as Mg—Ca—Al silicates, kieselguhr, ground quartz, feldspars, talc, kaolin or mica (diatomaceous earth); naturally occurring or precipitated carbonates, such as chalk or dolomite; naturally occurring or precipitated sulfates, such as gypsum, Ca sulfate, Mg sulfate or Ba sulfate (barytes); and oxides and hydroxides, such as titanium oxide, Ca oxide, Mg oxide, Zn oxide, Mg hydroxide or Al hydroxide.

Preferred fillers are chalk, dolomite and barytes. The fillers must have a high freeness (small particle size). The particle size is preferably between 0.5 and 20 μm for the major part of the filler, a small coarse fraction not having an interfering effect. In addition, the fillers in the binder composition according to the invention are barely soluble in water, preferably soluble in proportions of less than 0.2% by weight.

Correct adjustment of the viscosity is also a decisive factor for problem-free lamination without swelling of the tissues, avoiding tearing of the tissue web, and in order to achieve the desired applied amount on the tissue. The viscosity of the binder composition is 600 to 35000 mPa.s, preferably 800 to 1800 mPa.s.

Depending on the filler content and on the solids content of the plastics dispersion in the binder composition, the viscosity has to be increased or reduced for adjustment to the claimed viscosity range. In order to increase the viscosity, a thickener having a water-retaining action can be added to the binder composition. As a result of the water-retaining action, the water is retained in the binder by the thickener and migration of the binder water into the tissue during lamination is delayed. In order to lower the viscosity, a dispersing agent can be added to the binder composition, which dispersing agent, in addition to dispersing and stabilizing the filler in the binder composition, especially in the case of a high filler content and fillers having a powerful thickening action (for example kaolin), distinctly lowers the viscosity.

Suitable thickeners are, in particular, those which impart a thixotropic character to the dispersion. Examples of such thickeners are polyacrylic acids and their salts, soluble cellulose derivatives, such as hydroxyethylcellulose, alginates or polyurethanes. Preferably, polyacrylic acids and their salts are used at a pH of below 5. Usually up to 4 parts by weight, preferably 0.01 to 0.1 part by weight, of thickener are used in the binder composition.

Dispersing agents suitable for adjustment of the viscosity are, for example, potassium, sodium or ammonium salts of polymeric carboxylic acids. The dispersing agent is added to the binder composition in amounts of at least 0.1 parts by weight, preferably of from 0.1 to 1.0 part by weight.

For special finishing of tissue laminates, the binder composition can also comprise agents imparting hydrophobic properties, flameproofing agents or plasticizers. Suitable agents imparting hydrophobic properties are those based on fluorocarbons or silicones, which can be added in an amount of from 0.01 to 1.0% by weight, with respect to the laminate. Suitable flameproofing agents are those based on polymeric nitrogen-phosphorus compounds, for example ammonium polyphosphate, in an amount of from 5 to 200% by weight, with respect to the plastics content in the binder composition. Suitable plasticizers, for intensifying the soft and supple handle of the tissue laminates, are, for example, amino-functional silicone oils in an amount of from 0.2 to 5.0% by weight, with respect to the plastics content, or alkyl phthalates in an amount of from 1.0 to 20% by weight, with respect to the plastics content in the binder composition.

In order to suppress foaming during mixing and during lamination, it is advisable to add an antifoam, for example based on higher alcohols or silicone oils, to the binder composition.

Preferred binder compositions have a viscosity of 800 to 1800 mPa.s and a solids content of more than 70% by weight and comprise a) 40 to 60 parts by weight of an aqueous plastics dispersion which has a solids content of 45 to 55% by weight and is based on vinyl acetate/ethylene copolymers, vinylacetate/ethylene/N-methylol(meth)acrylamide terpolymers, alkyl acrylate/N-methylol-(meth)acrylamide copolymers and vinyl acetate/ ethylene/alkyl acrylate copolymers or vinyl acetate/ alkyl acrylate copolymers, which optionally have a N-methylol(meth)acrylamide content, b) 50 to 300 parts by weight of chalk, dolomite or barytes which has a particle size of 1 to 20 μm and a solubility in water of less than 0.2% by weight, and, where appropriate, c) 0.01 to 0.1 parts by weight of thickeners based on polyacrylic acids and their salts at a pH of less than 5 and/or 0.1 to 1.0 parts by weight of dispersing agents based on the potassium, sodium or ammonium salts of polymeric carboxylic acids.

The most preferred binders of the abovementioned composition are those which comprise, as component a), vinyl acetate/ethylene copolymers which have a vinyl acetate content of 60 to 90% by weight and an ethylene content of 10 to 40% by weight, with respect to the total weight of the copolymer, or vinyl acetate/ethylene/N-methylolacrylamide terpolymers which have a vinyl acetate content of 60 to 90% by weight, an ethylene content of 10 to 40% by weight and a N-methylolacrylamide content of 1 to 10% by weight, with respect to the total weight of the terpolymer.

In order to prepare the binder composition, the aqueous plastics dispersion is preferably initially introduced and the antifoam, where appropriate together with a dispersing agent, is stirred in. The pulverulent filler is then mixed in batchwise with vigorous stirring. If the filler tends to agglomerate, it can optionally be prepared as a paste before adding. Finally, the viscosity is adjusted by adding dispersing agent or thickener.

The binder composition according to the invention is particularly suitable for the lamination of tissue fabrics. Tissues of this type are usually wet-laid from cellulose pulp or fibers, having a weight per unit area of 18 to 25 g/m$^2$, and can easily be bound with wet-strength agents.

The production of the tissue laminates using the binder composition according to the invention is preferably carried out in a multistage process, in which one or two tissue layers are coated with the aqueous binder composition in the first step and a further tissue layer is laminated on, after coating the prelaminate, in each of the subsequent process steps.

In the first process step for the production of a two-layer prelaminate, the binder composition according to the invention, optionally without a filler content, is applied to a single-layer tissue, for example by spraying or rotary screen printing or by means of a gravure roller. The application is preferably not over the whole surface and is in an amount of from 5 to 15 g/m$^2$. After application of the binder, a further single-layer tissue is laminated on and the prelaminate is dried. After drying, a further 20 to 80 g/m$^2$ of binder composition is applied to the two-layer prelaminate, for example using a rotary screen or a roller, and a further layer of tissue is laminated on. Finally, the laminate is dried, preferably by means of a gelling roller.

A further possibility for the production of tissue laminates using the binder composition according to the invention comprises applying the first batch of the binder to a silicone release paper using a doctor blade. A single-layer or two-layer tissue is placed in the dispersion film and then dried. After drying, the precursor is separated from the release paper and a tissue layer is laminated onto the tacky side of the precursor.

Laminates which in respect of softness, drapability and wrinkling, are at least equivalent to the tissue laminates bound with plastisol are thus accessible using the binder composition according to the invention, without having to accept the disadvantages which have already been described. In particular, however, the laminates have a distinctly higher wet strength.

The following examples serve to further illustrate the invention.

Preparation of the binder composition:

EXAMPLE 1

50 parts by weight of an aqueous plastics dispersion having a solids content of 52% by weight and based on a terpolymer comprising 70% by weight of vinyl acetate, 25% by weight of ethylene and 5% by weight of N-methylolacrylamide were initially introduced and 0.2 parts by weight of an ammonium salt of a polycarboxylic acid as well as 0.033 parts by weight of a silicone antifoam were added, with stirring. 37 parts of barytes having an average particle size of 1 μm were then added. Finally, 0.033 parts by weight of polyacrylic acid was also added. A binder having a solids content of 76% by weight and a viscosity of 1500 mPa.s (Brookfield 20 rpm, 20° C.) resulted. The pH value was adjusted to 4.5.

EXAMPLE 2

A binder composed of 56 parts by weight of the plastics dispersion from Example 1, 44 parts by weight of gypsum having an average particle size of 10 μm, 0.1 part by weight of an ammonium salt of a polycarboxylic acid and 0.033 part by weight of silicone antifoam was prepared analogously to Example 1. The pH value was adjusted to 4.5. The composition had a solids content of 72% by weight and a viscosity of 1200 mPa.s (Brookfield 20 rpm, 20° C.).

EXAMPLE 3

A binder composed of 50 parts by weight of the plastics dispersion from Example 1, 37 parts by weight of dolomite having an average particle size of 10 μm, 0.4 part by weight of an ammonium salt of a polycarboxylic acid and 0.033 part by weight of silicone antifoam was prepared analogously to Example 1. The pH value was adjusted to 7.0. The composition had a solids content of 76% by weight and a viscosity of 1320 mPa.s (Brookfield 20 rpm, 20° C.).

Production of the tissue laminates for testing the wet strength:

The binder compositions from Examples 1 to 3 were used to produce tissue laminates in accordance with the following procedure:

Using a 100 mm spiral blade, a dispersion film was drawn on a silicone release paper using the binder composition. Two layers of a viscose staple tissue weighing 23 g/m$^2$ were placed in the dispersion, while it was still wet, using a magnetic blade. The whole was then dried for a further one minute at 100° C. in a Mathis drier. After drying, the laminate was separated from the release paper. A layer of the tissue was laminated onto the tacky side of the laminate using a photopress and iron.

Comparison Example A

A three-layer viscose staple tissue laminate was used which was laminated with a plastisol (commercial product). Wet strength testing:

The test to determine the wet strength (tensile strength) was carried out in accordance with DIN 53857.

Prior to measurement, the laminates were exposed to a standard climate (air temperature 22° C., relative atmospheric humidity 55%) and also stored for one minute in distilled water. 10 test strips (100 mm long, 15 mm wide) were taken from each of the acclimatized laminates per measurement, five strips being taken transversely to the direction of production and five longitudinally to the direction of production. The maximum tensile force (MTF) at tear of the laminate was determined on a tensile testing machine and in each case the average value was calculated from the five individual tests.

The results are given in Table 1.

TABLE 1

| Laminate [Example] | Tensile strength | |
|---|---|---|
| | Longitudinal [N] | Transverse [N] |
| 1 | 10.4 | 4.2 |
| 2 | 5.1 | 3.0 |
| 3 | 8.8 | 3.3 |
| A | 4.9 | 2.7 |

We claim:

1. A process for binding two or more layers of tissue fabrics derived from cellular pulp or cellulose fiber and having a weight per unit area of 18 to 25 g/m², which comprises:

(i) applying a binder composition having a viscosity of 600 to 35000 mPa.s and comprised of:

(a) 10 to 80 parts by weight of an aqueous plastics dispersion which has a solids content of 30 to 70% by weight and is based on one or more copolymers from the group comprising vinyl acetate/ethylene copolymers, vinyl acetate/ethylene/N-methylol-(meth)acrylamide terpolymers, alkyl acrylate/N-methylol(meth)acrylamide copolymers and vinyl acetate/ethylene/alkyl acrylate copolymers, or vinyl acetate/alkyl acrylate copolymers, which optionally have a N-methylol(meth)acrylamide content, (b) 50 to 300 parts by weight of an organic or inorganic filler which is sparingly soluble in water and has an average particle size of 0.5 to 100 μm, and (c) 0 to 4 parts by weight of a thickener and/or at least 0.1 parts by weight of a dispersing agent to a portion of a single layer of tissue in an amount of 5 to 15 g/m², affixing a further single layer of tissue thereto and drying to obtain a prelaminate;

(2) Applying additional binder composition in an amount of 20 to 80 g/m² to the prelaminate, affixing a further single layer of tissue thereto, and drying and (3) optionally repeating step (2) one or more times.

2. The product obtained by the process of claim 1.

3. The product of claim 2, which comprises, as component a), vinyl acetate/ethylene copolymers which have a vinyl acetate content of 60 to 90% by weight and an ethylene content of 10 to 40% by weight, with respect to the total weight of the copolymer, or vinyl acetate/ethylene/N-methylolacrylamide terpolymers which have a vinyl acetate content of 60 to 90% by weight, an ethylene content of 10 to 40% by weight and a N-methylolacrylamide content of 1 to 10% by weight, with respect to the total weight of the terpolymer.

4. The product of claim 2, wherein the aqueous plastics dispersions have a solids content of 45 to 55% by weight.

5. The product of claim 2, wherein the proportion of plastics dispersion in the binder composition is 40 to 60 parts by weight.

6. The product of claim 2, wherein chalk, dolomite or barytes is used as component b).

7. The product of claim 2, wherein the thickeners used are polyacrylic acids and their salts, and soluble cellulose derivatives.

8. The product of claim 2, wherein the dispersing-agents used are potassium, sodium or ammonium salts of polymeric carboxylic acids.

9. The product of claim 2 wherein the thickeners are selected from the group consisting of hydroxyethylcellulose, alginates and polyurethanes.

* * * * *